United States Patent [19]

Murphy

[11] Patent Number: 4,645,970
[45] Date of Patent: Feb. 24, 1987

[54] ILLUMINATED EL PANEL ASSEMBLY

[75] Inventor: Michael D. Murphy, Holland, Mich.

[73] Assignee: Donnelly Corporation, Holland, Mich.

[21] Appl. No.: 668,412

[22] Filed: Nov. 5, 1984

[51] Int. Cl.⁴ .................. H05B 33/26; H05B 33/22
[52] U.S. Cl. .................... 313/509; 313/513; 40/544
[58] Field of Search .............. 313/506, 511, 512, 509; 40/544

[56] References Cited

U.S. PATENT DOCUMENTS

| 1,419,093 | 6/1922 | Zepka . | |
| 1,786,033 | 12/1930 | Smith . | |
| 1,805,798 | 5/1931 | Bedrossyan . | |
| 1,856,519 | 5/1932 | Spears . | |
| 2,069,368 | 2/1937 | Horinstein | 40/133 |
| 2,114,711 | 4/1938 | Horinstein | 40/133 |
| 2,130,090 | 9/1938 | Imhofe | 40/130 |
| 2,132,474 | 10/1938 | En Holm | 40/132 |
| 2,132,475 | 10/1938 | En Holm | 40/132 |
| 2,159,328 | 5/1939 | Horinstein | 116/124.1 |
| 2,221,887 | 11/1940 | White | 40/130 |
| 2,478,817 | 8/1949 | Gaiser | 88/105 |
| 2,492,224 | 12/1949 | Kaplan et al. | 178/7.5 |
| 2,557,402 | 6/1951 | Altheimer | 40/135 |
| 2,580,014 | 12/1951 | Gazda | 177/329 |
| 2,581,632 | 1/1952 | Colbert et al. | 88/105 |
| 2,595,331 | 5/1952 | Calihan et al. | 177/329 |
| 2,600,751 | 6/1952 | Gazda | 177/329 |
| 2,716,298 | 8/1955 | Spielmann et al. | 40/132 |
| 2,721,808 | 10/1955 | Roberts et al. | 117/8 |
| 2,733,367 | 1/1956 | Gillson, Jr. . | |
| 2,749,541 | 6/1956 | Whittlesey | 340/381 |
| 2,790,161 | 4/1957 | Joormann | 340/202 |
| 2,790,350 | 4/1957 | Cameron | 88/77 |
| 2,858,632 | 11/1958 | Caserio et al. | 40/132 |
| 2,872,567 | 2/1959 | Strange | 240/8.16 |
| 2,907,249 | 10/1959 | Hjermstad | 88/78 |
| 2,919,366 | 12/1959 | Mash . | |
| 2,922,912 | 1/1960 | Miller . | |
| 2,922,993 | 1/1960 | Sack, Jr. | 340/324 |
| 2,928,974 | 3/1960 | Mash . | |
| 2,982,039 | 5/1961 | Hardesty | 40/130 |

(List continued on next page.)

FOREIGN PATENT DOCUMENTS

| 500566 | 2/1931 | Fed. Rep. of Germany . | |
| 2035454 | 1/1972 | Fed. Rep. of Germany . | |
| 2611339 | 10/1976 | Fed. Rep. of Germany . | |
| 1116612 | 2/1956 | France . | |
| 1155597 | 12/1957 | France | 313/509 |
| 2354605 | 6/1976 | France . | |
| 2472795 | 6/1981 | France . | |
| 57-165803 | 10/1982 | Japan . | |
| 57-171385 | 10/1982 | Japan . | |
| 111647 | 10/1967 | Norway . | |
| 430673 | 6/1935 | United Kingdom . | |
| 527266 | 10/1940 | United Kingdom . | |
| 813060 | 5/1959 | United Kingdom . | |
| 1161977 | 8/1969 | United Kingdom . | |
| 2099628 | 12/1982 | United Kingdom . | |

OTHER PUBLICATIONS

Electroluminescent Lighting Applied to Decorative Trim", Automotive Engineering, vol. 88, No. 4, Apr. 1980, pp. 24-27.

"Electroluminescent Display System Considerations" from Electronic Displays '80, Session 1, by Stephen Foldes, Endicott Research Group.

"User Information Guide-Electroluminescent Products", Aug. 1983, Timex Corporation, Electroluminescent Products, P.O. Box 2126, Waterbury, Conn. 06720 News Release "Timex Corporation Enters Electrolumi- Primary Examiner—Palmer C. DeMeo
Attorney, Agent, or Firm—Price, Heneveld, Cooper, DeWitt & Litton

[57] ABSTRACT

A decorative panel assembly for vehicles, appliances or other applications including illuminated indicia, isignia or designs in registry with at least one transparent area in one of two panels. Illumination of the insignia/-designs is made with a thin, composite electroluminescent lighting assembly which substantially avoids lamination problems between the supporting panels. Electrical connections are made through at least one transparent, electrically conductive coating on at least one of the panels such that the illuminated insignia, indicia or designs appear to "float" within the panel assembly without any electrical connections being visible around the illuminated element.

37 Claims, 16 Drawing Figures

U.S. PATENT DOCUMENTS

| | | | |
|---|---|---|---|
| 3,004,359 | 10/1961 | Pisciotta | 40/129 |
| 3,008,065 | 11/1961 | Chamberlin | |
| 3,027,668 | 4/1962 | Hardesty | 40/130 |
| 3,047,052 | 7/1962 | Fridrich | 156/580 |
| 3,083,317 | 3/1963 | Fish et al. | 315/87 |
| 3,125,741 | 3/1964 | Kenneally | 340/24 |
| 3,161,974 | 12/1964 | Blockson | 40/130 |
| 3,182,415 | 5/1965 | Brooks | 40/130 |
| 3,246,204 | 4/1966 | Katona | 315/313 |
| 3,309,712 | 3/1967 | Cole | 346/74 |
| 3,316,435 | 4/1967 | Kelso | |
| 3,404,474 | 10/1968 | Johnson | 40/130 |
| 3,545,110 | 12/1970 | Coolbaugh et al. | 40/130 |
| 3,657,778 | 4/1972 | Boucher | 29/25.16 |
| 3,670,067 | 6/1972 | Coolbaugh et al. | 264/154 |
| 3,680,237 | 8/1972 | Finnerty, Sr. | 40/130 |
| 4,070,781 | 1/1978 | Sauer | 40/129 |
| 4,240,220 | 12/1980 | Smith | 40/564 |
| 4,253,097 | 2/1981 | Hochstrate | 340/781 |
| 4,258,492 | 3/1981 | Williams | 40/593 |
| 4,376,145 | 3/1983 | Frame | 428/195 |
| 4,494,326 | 1/1985 | Kanamori | 40/593 |

OTHER PUBLICATIONS nescent Products Market" by Timex Industrial Products Division, Waterbury, Conn. 06720.

"Announcement-Electroluminescent Lighting (EL) System", Timex Corporation, Waterbury, Conn. 06720.

"Specifications for DMI Display Conductive Coating", General Specification Sheet PD5002, revised Dec. 5, 1980, Donnelly Mirrors, Inc., Holland, Mich., USA "Electroluminescent Cell With Long Light Decay and Color Shift" by Simon Larach (Aug. 9, 1957).

ILLUMINATED EL PANEL ASSEMBLY

BACKGROUND OF THE INVENTION

This invention relates to decorative panel assemblies for vehicles such as automobiles and trucks, boats, and aircraft, as well as for appliances, wherein the panel assembly includes indicia, insignia or designs which are illuminated for display purposes.

In recent years, varying efforts have been made to provide illuminated decorative displays especially for use in vehicles including automobiles, trucks, boats and aircraft, as well as in other applications such as appliance doors, store displays, and the like. Such displays have included various arrangements such as mirror plates having illuminated indicia or designs therebehind, edge lighted transparent sheets with letters or other indicia etched or carved into the surfaces for illumination, and numerous types of illuminated instrument panel displays using electroluminescent layers of one type or another. Electroluminescent panels typically include a layer of electroluminescent phosphor or phosphor mixed with some type of dielectric material sandwiched between electrically conductive coatings or layers which are connected to appropriate power sources. This entire assembly is usually applied in stages to a transparent or other supporting substrate and illuminated by the connection of an appropriate power source to the conducting layers such that light is emitted through or away from the substrate. In some cases, one of the electrically conductive layers is configured in the desired design such that the electroluminescent layer provides light only in the areas of the configured electrode.

More recently, efforts have been made to apply electroluminesent technology to the display of automobile insignia and other designs in passenger cars and other vehicles. At least one prior art assembly has included a solid metal symbol or insignia of a predetermined design behind which was placed a relatively planar electroluminescent assembly or pad of a large thickness. Wire leads were connected directly to the electroluminescent pad. This assembly suffered from several drawbacks however.

First, it was difficult to secure to the exterior of the vehicle and yet protect it from the elements to which an automobile is exposed in normal use. Moreover, the power supply required by the assembly created significant radio interference within the automobile and, thus, of necessity, was required to be placed at as great a distance from the radio as possible to reduce such interference as much as possible. Of course, this severely limited the positions in which the insignia could be displayed on the vehicle.

Further, prior known electroluminescent pad assemblies were of significant thickness, i.e., in the range of 0.060 to 0.090 inches. Such thickness required special mounting arrangements for the assemblies and virtually eliminated any possibility of laminating the electroluminescent assemblies within panel displays such as window assemblies or other areas where positioning and attachment to vehicles would be made easier.

In addition to the above problems, the required electrical connections to prior known assemblies were typically bulky or obtrusive and prevented many aesthetically pleasing displays of the type desired for vehicle applications. Electrical connections typically included highly visible solid metallic conductors leading to light sources or electroluminescent pad assemblies. Of necessity, such conductors usually had to be led directly to the back or sides of a display and required significant masking to make the entire assembly visually pleasing. Accordingly, indicia or design displays could not be positioned in the center of large transparent areas or in the middle of other panel displays without unsightly conductors being included which would detract from the appearance of the assembly.

Therefore, the need was apparent for a lighted indicia, insignia or design display assembly which would be sufficiently small to enable incorporation in laminated panel assemblies for vehicles such as laminated windows or the like, and yet which would eliminate unsightly electrical conductors which previously had prevented use of illuminated displays in many applications. The present invention was devised as a solution to these and other problems.

SUMMARY OF THE INVENTION

The present invention provides a panel assembly for displaying illuminated indicia, insignia or designs especially adapted for use in vehicles such as automobiles, trucks, boats and aircraft or in appliances, signs or the like. The invention is especially useful where display is desired of an insignia, indicia or design in a transparent field such as within a window assembly. The invention provides a complete panel assembly including transparent areas adapted to allow visibility of desired indicia or designs and either full illumination or backlighting of such indicia or designs. The panel assemblies may be incorporated in various supports such as in conventionally known window frames or units. The indicia or designs appear to "float" within the transparent area of the assembly since there are no visible electrical conductors present or leading to or from the illuminated indicia or design.

In one form of the invention, a panel assembly for displaying illuminated indicia, insignia or designs is provided having a pair of sheet-like panels at least one of which includes a transparent area. Lamination means are provided intermediate the panels for bonding the panels together. The lamination means are transparent after such lamination, at least in an area corresponding to the transparent area of the one panel. A transparent, electrically conductive coating means is applied on one inwardly facing surface of at least one of the panels. In addition, an electroluminescent lighting means for illuminating an area of the assembly when an electrical voltage is applied thereto is included. The lighting means is formed in a desired configuration between the panels such that it is in registry with the transparent area of the one panel and has a surface contacting the transparent, electrically conductive coating means. The lighting means may be formed separately and inserted into the assembly or be deposited directly on one of the panel members. Conducting means are positioned away from the lighting means for conducting electricity to the electrically conductive coating. In such assembly, the panels and lamination layer form a laminated assembly which supports and positions the lighting means so that, when the conducting means are connected to an electrical source, they are illuminated without any electrically conductive means being visible adjacent or around the lighting means.

In other forms of the invention, a metallic layer may be included between the lighting means and the one panel and covering at least a portion of the lighting means such that it is visible through the transparent area. The metallic layer may be either a partially reflective, light transmitting metallic film or an opaque metal element which partially outlines or partially covers the electroluminescent lighting means. In the latter assembly, a second resinous plastic laminating layer is included between the metal symbol and one of the panels to help position and properly retain the symbol and lighting means.

A further form of the invention may include a thin object positioned between the lighting means and one of the panels, the object being formed in a desired configuration and covering at least a portion of the lighting means. The object may be formed of metal, high temperature resistant resinous plastic, or other materials and may be opaque, translucent or tinted in a desired color.

In one form of the invention, transparent electrically conductive coatings are included on the inside surfaces of both panels while the electroluminescent lighting means itself includes electrical connections which convey electrical energy from one transparent, electrically conductive coating to the other.

In another form of the invention, mutually insulated backing electrodes are provided on the lighting assembly in contact with mutually insulated transparent electrically conductive coating areas on only one panel such that electric current flows through the transparent coating to and from only the back of the electroluminescent light assembly to further reduce any visible connections.

In preferred embodiments, the panels may be either transparent glass sheets or sheets of other material such as high temperature resistant plastic. In addition, one of the the panels may be translucent or opaque.

Accordingly, the present invention allows the lamination of insignia, indicia or designs within a typical laminated window assembly or panel assembly for vehicles and the illumination of such design through the use of at least one transparent electrically conductive coating which eliminates all visible electrical connections adjacent or around the designs in such assemblies. The invention allows inclusion of such insignia or designs without delamination or other separation problems occurring. The designs may be displayed in transparent fields or against opaque or translucent backgrounds. Moreover, electrical interference with radio reception is kept to a minimum through the use of appropriate transformers and other power sources located immediately adjacent window assemblies or other panel assemblies in which the present invention is incorporated. Therefore, the present invention provides a low cost, highly reliable, substantially shock proof, illuminated panel assembly which is both aesthetically pleasing and highly adaptable to location in various positions in a vehicle or appliance.

These and other objects, advantages, purposes and features of the invention will become more apparent from a study of the following description taken in conjunction with the drawings.

DESCRIPTION OF THE PREFERRED EMBODIMENTS

Figures 1, 2, 2A, 3, 4, 5:
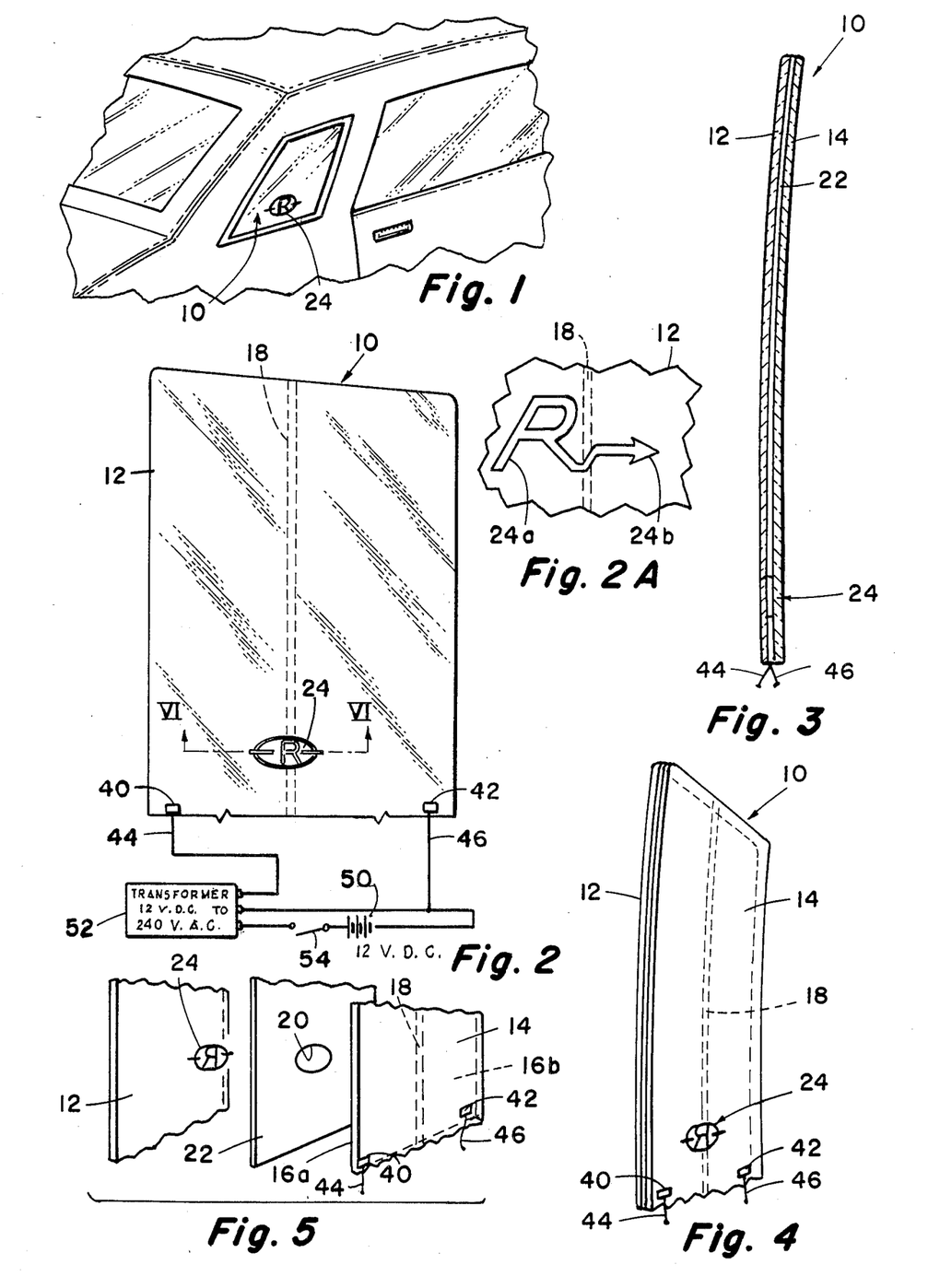
FIG. 1 is a fragmentary, perspective view of a panel assembly of the present invention incorporated in the rear window post of an automobile.
FIG. 2 is a front perspective view of a typical panel assembly of the present invention.
FIG. 2a is a front view of a portion of a modified panel assembly including an insignia or design purposely offset to produce brighter illumination areas.
FIG. 3 is a side sectional view of the panel assembly of FIG. 2.
FIG. 4 is a rear perspective view of the panel assembly of FIGS. 2 and 3.
FIG. 5 is an exploded, fragmentary view of a portion of the panel assembly of FIGS. 2-4.

Referring now to the drawings in greater detail, FIGS. 1-6 illustrate a first embodiment 10 of the decorative panel assembly of the present invention adapted for displaying illuminated indicia, insignia or other designs such that the designs appear to "float" within a transparent area without any visible means of electrical connection. The invention provides high visibility, high definition display of desired insignia especially for decorative purposes on vehicles, appliances or in other places and may be easily manufactured and incorporated into known assemblies for attachment and support. For example, as shown in FIG. 1, the present invention may comprise a panel assembly incorporated in a modular-type window assembly secured in the rear roof support post on a conventional automobile, truck or the like. The insignia or design incorporated in the assembly is visible during daylight as a normal decoration on the automobile but is illuminated at night for vehicle identification or other purposes in a position which would not produce undesirable glare or undesired light in the eyes of the driver of the vehicle or other vehicles. Moreover, the assembly requires no extra space and therefore does not disrupt normal styling lines or aerodynamic features of the automobile.

As shown in FIGS. 2-6, panel assembly 10 includes a pair of substantially rigid, thin, flat, sheet-like panel members or pieces 12, 14 forming the exterior surfaces of a laminated assembly and between which is sandwiched at least one lamination layer 22. Preferably, one of the panel members, usually that designed to face the exterior of the vehicle, appliance or other application in which the assembly will ultimately be mounted, includes a transparent area or portion. The back or rear panel 14 may be transparent or may be translucent or opaque. In assembly 10, panels 12 and 14 are formed from transparent glass sheets which are formed with a slight curvature as shown in FIG. 3 to correspond to the contour of the vehicle in which they are to be mounted. Lamination layer 22 is preferably formed from a sheet of flexible, resinous polymeric material such as polyvinyl butyral which, although translucent before lamination under heat and pressure, is generally transparent thereafter. As will be more fully explained hereinafter, glass sheets 12, 14 are bonded together with the polyvinyl butyral sheet through the application of heat and pressure such as in an auto-clave or with other methods which are conventionally known in the safety glass industry. The glass sheets 12, 14 preferably each have a thickness of approximately 0.090 inches, although thicknesses within the range of 0.060 to 0.125 inches could also be used. The panel members may be formed from plastic or other materials as long as one of the members includes a transparent area and may have a range of thicknesses. Lamination layer 22 typically has a thickness of about 0.015 inches prior to compression in lamination, and a thickness about 0.010 inches after lamination. Multiple layers of lamination material can also be used.

Figure 6:
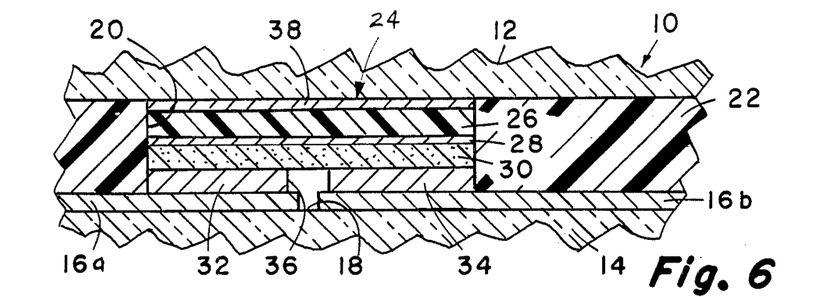
FIG. 6 is an enlarged, fragmentary, sectional view of one portion of the panel assembly of FIGS. 2-5 taken along plane VI—VI of FIG. 2.

Prior to lamination, rear panel member 14 is coated with a pair of electrically separated, mutually insulated, transparent, electrically conductive coating areas 16a, 16b each having a thickness of between 250 and 500 Angstroms, preferably 280 Angstroms, and an electrical resistivity of within the range of approximately 100 to 300 ohms per square. Preferably, these coatings will be formed as fully oxidized, nonreduced, indium tin oxide films which exhibit substantially achromatic color when viewed under normal working or leisure conditions. However, reduced coatings could also be used. In addition, the film coatings are resistant to solvent interaction, etching, adhesion, abrasion and humidity in accordance with General Specification Sheets PD5002 to PD5005 entitled "SPECIFICATIONS FOR DMI DISPLAY CONDUCTIVE COATINGS" by Donnelly Corporation of Holland, Mich. These coatings can be changed as desired to modify light transmission, resistivity and color. As seen in FIGS. 2 and 4-6, coatings 16a, 16b are separated by a deletion or dielectric area formed by an uncoated strip or line 18 running longitudinally from top to bottom along the center of rear panel 14. Deletion or dielectric line or strip 18 is substantially invisible except upon extremely close examination. In addition, as is best seen in FIG. 6, conductive coatings 16a, 16b are applied to the inner surface of rear panel 14 and face inwardly in the laminated assembly.

As is also seen in FIGS. 2, 4 and 5, the insignia, indicia or design 24 is received in a correspondingly shaped cutout 20 in lamination layer 22. Cutout 20 outlines the exterior shape of insignia or design 24 and allows the overall thickness of the assembly 10 to remain the same as the combined thicknesses after lamination of glass panels 12, 14 and polyvinyl butyral lamination layer 22. In addition, cutout 20 helps to locate and retain design or insignia 24 in its proper position in registry with and for viewing through the transparent area of the front panel 12 and in proper position for electrical contact with the separate transparent electrically conductive coating areas 16a, 16b as is more fully described hereinafter.

Insignia, indicia or design 24 is formed as a relatively flexible, bendable electroluminescent lighting assembly or pad best seen in FIG. 6. Lighting assembly or pad 24 is a composite of several layers and provides a thin, solid state, substantially shock proof, luminescent light source when an electrical voltage is applied thereacross. In the preferred embodiment, assembly or pad 24 includes a base or support layer 26 of thin polyester film which is also light transmitting or, at least, translucent to light incident thereon. One such film is "MYLAR" (trademark) produced by E. I. DuPont de Nemours and Co. of Wilmington, Delaware. On the rear side of layer 26 is formed another transparent, electrically conductive coating 28 such as from indium tin oxide or another conductive coating material. Over conductive coating 28 is applied a layer 30 of electroluminescent phosphor material of any one of several conventionally known types. One such phosphor material will produce a bluish-green color when energized. Other materials such as zinc sulfide-zinc oxide with suitable activators such as copper, manganese, lead or silver dispersed in an organic polymeric matrix such as cyanoethyl cellulose can also be used. Color will vary with the particular phosphor material chosen. Alternately, layer 30 may comprise two separate layers, one of a phosphor layer immediately adjacent conductive layer 28 followed by a suitable dielectric layer. Over electroluminescent phosphor layer 30 are applied a pair of backing electrodes 32, 34 preferably formed from a thin layer of metallic material such as nickel, although other metallic materials could also be used. Backing electrodes 32, 34 are also separated by a deletion or dielectric area 36 comprising an uncoated line or strip extending longitudinally from top to bottom across the entire back of indicia, insignia or design 24 and adapted to be aligned with the deletion line 18 in conductive layer 16 on rear panel member 14. Deletion line 18 preferably has a width of 0.010 to 0.050 inches while deletion line 36 is somewhat wider and in the range of about 0.025 to 0.100 inches.

One suitable electroluminescent lighting assembly including layers and coatings 26, 28, 30, 32 and 34 is that commercially available from Timex Corporation of Waterbury, Conn. under the designation Electroluminescent Lighting System. Overall, the combined layers 26 to 34 are formed in a manner consistent with and similar to the electroluminescent device disclosed in U.S. Pat. No. 2,928,974 to D. H. Mash, the disclosure of which is hereby incorporated by reference herein. In U.S. Pat. No. 2,928,974, an electroluminescent device is disclosed wherein an even number of backing electrodes are separately connected to electrical conductors such that the device emits light when energized even though a transparent, electrically conductive coating within the composite is not directly connected to an electrical source but, rather, is energized with an electric potential across a phosphor layer.

As seen in FIG. 6, between base or support layer 26 and the inside surface of front glass panel 12 is a metallic layer 38 which, in assembly 10, is preferably formed from a thin, partially reflective, light transmitting metallic film which may be sputtered or otherwise applied to the polymeric support surface. Preferably, layer 38 has a preferred light transmission of approximately 8 to 15% for light incident thereon, and a reflectivity of approximately 85 to 92% of incident light. One suitable metallic material for use in sputter coating layer 38 has been found to be 304 stainless steel of conventionally known composition. In assembly 10, thin, metallic layer 38 is applied over the entire surface of the electroluminescent lighting assembly 24, although assembly 24 itself is stamped or otherwise formed in an insignia or shape as desired and may include cutouts, relieved areas, or the like therein.

Alternately, layers 32, 34, 30, 28, 26 and 38 could be deposited and built up layer by layer in a conventionally known manner on a resinous polymeric, paper or other transfer sheet which is removed after insignia 24 is cut or configured from the layers on the transfer sheet and deposited or positioned at the desired location on panel 12 or coated panel 14.

Figure 6A:
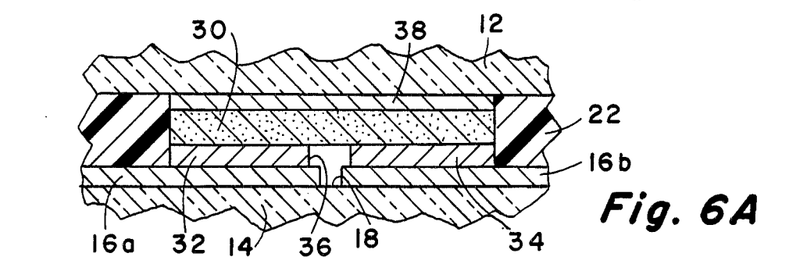
FIG. 6a is an enlarged, fragmentary sectional view of one portion of a modified panel assembly wherein the electroluminescent lighting assembly is applied directly to a panel member.

Another alternative is to paint on or mechanically deposit the various layers of the lighting assembly directly on panel 12 in the desired configuration and position using conventionally known masking or other deposition techniques. As shown in FIG. 6a, it is also possible in such case to delete and eliminate support layer 26 and conductive coating 28 since direct deposit on one of panels 12 or 14 would provide the necessary support and metallic layer 38 would substitute in function for conductive coating 28. This provides an even thinner overall laminated panel assembly.

When electrical voltage is applied through conductive coatings 16a, 16b to illuminate the phosphor layer 30, light is emitted through transparent electrically conductive coating 28, support layer 26, and thin metallic coating 38 such that the insignia or design 24 is visible through the front glass sheet 12 at night or in other periods of low ambient light. In order to conduct electricity to transparent conductive coatings 16a, 16b, appropriate conductors are adhered or otherwise secured to the edge or outermost areas of coatings 16a, 16b at some distance from design or insignia 24 so as to be inconspicuous and/or in position to be covered by a frame which supports or secures the panel in a vehicle, appliance or the like. Conductors 40, 42 are preferably small spots, squares, rectangles or other geometric shapes of electrically conductive silver paint which are silk screened on in desired locations and fired to properly adhere them to the surface of conductive coatings 16a and 16b as shown in FIGS. 2, 4 and 5. Appropriate solid or braided lead wires 44, 46 or other conductors are soldered to the conductive paint spots and connected to a power source as explained more fully hereinafter. Preferably, the solder used to adhere wires 44, 46 to conductors 40, 42 is a standard, rosin-core solder composition having a high temperature resistance which melts above approximately 300° F. so as to resist the heat of lamination when panels 12 and 14 are combined with lamination layer 18 under heat and pressure as described above. A preferred silver paint for conductors 40, 42 is conductor composition number 7713 available from E. I. DuPont de Numours and Co. of Wilmington, Del.

As shown in FIG. 2, wires 44, 46 are connected to an appropriate power source 50 through switch 54 and transformer 52. Power source 50 may include a conventional 12-volt direct current voltage source such as a battery typically found in an automobile, truck or other vehicle. Preferably, transformer 52 is isolated, serves only the particular panel assembly in question, and converts the 12-volt direct current electricity to 240 volts alternating current which in turn is connected to the panel assembly 10. Of course, the transformer may be eliminated if an alternating current power source is available such as with a household appliance. As described in U.S. Pat. No. 2,928,974 incorporated by reference above, such alternating current voltage is applied across the deletion or dielectric strip 18 and the separated conductive areas 16a, 16b as well as across dielectric or deletion strip 36 and separate backing electrodes 32, 34 to apply the appropriate electrical voltage to the phosphor layer 30 such that a current path from backing electrode 32 through phosphor layer 30 along conductive layer 28 and back through phosphor layer 30 and backing electrode 34 is created. This, in effect, forms two electric lamps which are connected in series and have equal brightness as long as the surface area of the backing electrodes 32, 34 is maintained substantially equal on either side of deletion area 36. Alternately, a reduced amount of power consumption can be obtained by using a low duty cycle, pulsed, high frequency potential or power source as described in U.S. Pat. No. 4,253,097 to Paul Hochstrate and assigned to Timex Corporation. In any event, it is preferred that transformer 52 be positioned as close as possible to panel assembly 10 and that separate transformers be used for each different panel assembly. This minimizes electrical interference created by the alternating current power source.

Alternately, as shown in FIG. 2a, the surface area of the electroluminescent assembly on either side of deletion line 18 may be purposely modified such that backing electrodes 32, 34 have unequal surface areas. Thus, as shown in FIG. 2a, it may be desired in one application or another to provide a brighter portion in an insignia such as portion 24a comprising an "R" and a dimmer portion 24b comprising an arrow on opposite sides of deletion line 18. In such case, the larger surface area of portion 24a would create a brighter insignia "R" than the brightness of arrow portion 24b on the opposite side of deletion line 18. Of course, other designs or configurations for insignia 24 may be devised having brighter or dimmer portions depending on the surface areas placed on either side of deletion line 18.

To manufacture assembly 10, an appropriately shaped and curved piece of sheet glass or another substantially rigid rear back panel 14 is coated with appropriately positioned mutually insulated, transparent, electrically conductive coating areas 16a, 16b separated by deletion strip or line 18. Lamination layer 22 is positioned over coating area 16a, 16b such that cutout 20 is centered over the deletion line 18. This causes the deletion or dielectric strip 36 of composite lighting assembly 24 to be appropriately positioned over deletion line 18 as shown in FIG. 6. Thereafter, the front transparent glass panel or other panel 12 including a transparent area is positioned over the lamination layer 22 and design 24 such that the transparent area is in registry with the design. The entire assembly is then laminated with appropriate amounts of heat and pressure as is conventionally known to securely bond the panels 12, 14 together with lamination layer 22 which, although translucent before lamination, becomes transparent after lamination. Insignia or design 24 is, thus, permanently located or positioned such that deletion strips or lines 18 and 36 are in registry and the design or insignia is visible through the transparent area through the front glass or other panel 12. In addition, backing electrodes 32, 34 are permanently positioned such that the surface area of each is substantially equivalent thereby providing uniform brightness and intensity across the entire lamp, or alternately, are purposely offset or positioned to provide unequal surface areas on either side of deletion line 18 for unequal brightness as desired in the insignia. At night or in low ambient light conditions, when power is applied through source 50, transformer 52, and conductors 40, 42, electrical voltage is created in the design 24. The light is visible through the thin metallic layer 38 immediately behind front glass panel 12. In normal daylight conditions, the partially reflective metallic coating 38 will reflect a portion of the ambient light such that the design or insignia 24 stands out and is visible without illumination. In either case, the insignia or design 24 appears to "float" in the transparent area without any visible electrical connection thereto.

Referring now to FIGS. 7-10, a second embodiment 60 of the panel assembly is illustrated. Embodiment 60 is similar to embodiment 10 in that it includes a composite electroluminescent lighting assembly or pad 84 having separate, mutually insulated backing electrodes thereon engaging mutually insulated, separate conductive coatings 92, 94 on the inside surface of the rear panel member 64 which are separated by a deletion line 74 as well. Electroluminescent assembly 84, however, essentially backlights or illuminates an object or symbol 98 which covers only a part of the front surface of the electroluminescent lighting assembly. Generally, the compositions and thicknesses of the various panels, layers, coatings and films in assembly 60 are the same as in assembly 10.

Panel assembly 60 includes a pair of substantially rigid, oval shaped sheet glass panels 62, 64 forming the front and rear sides of the assembly, respectively. Front panel 62 has a marginal band of black ceramic frit 65 fired on its inside surface to form an opaque band bordering a smaller eliptical or oval transparent area 67 inside band 65. Rear panel 64 is entirely transparent, although it could be translucent or opaque.

Figures 7, 8, 9:
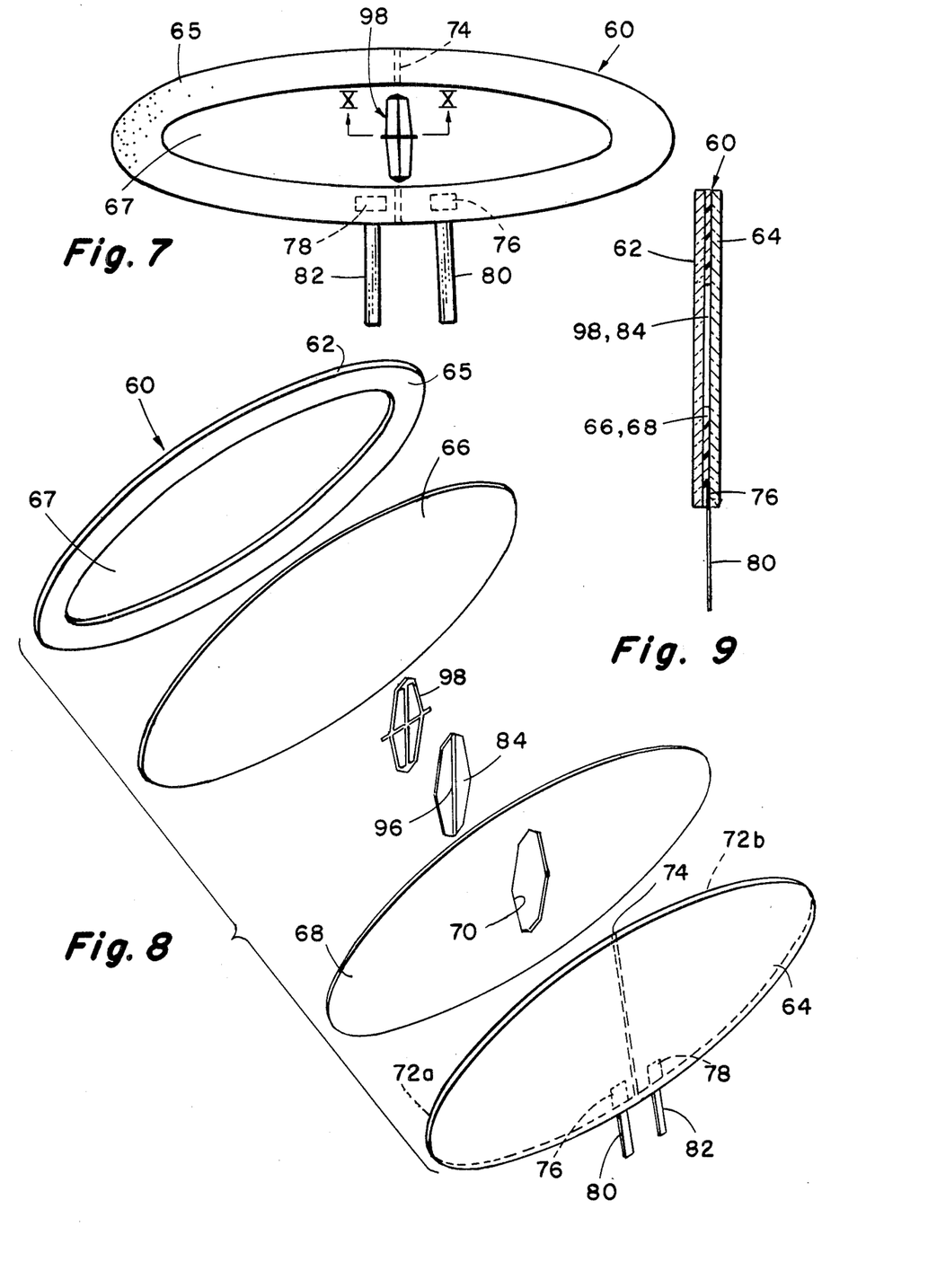
FIG. 7 is a front elevation of a second embodiment of the present invention.
FIG. 8 is a perspective, exploded view of the panel assembly of FIG. 7.
FIG. 9 is a sectional, side elevation of the panel assembly of FIGS. 7 and 8 taken along plane IX—IX of FIG. 7.
Figure 10:
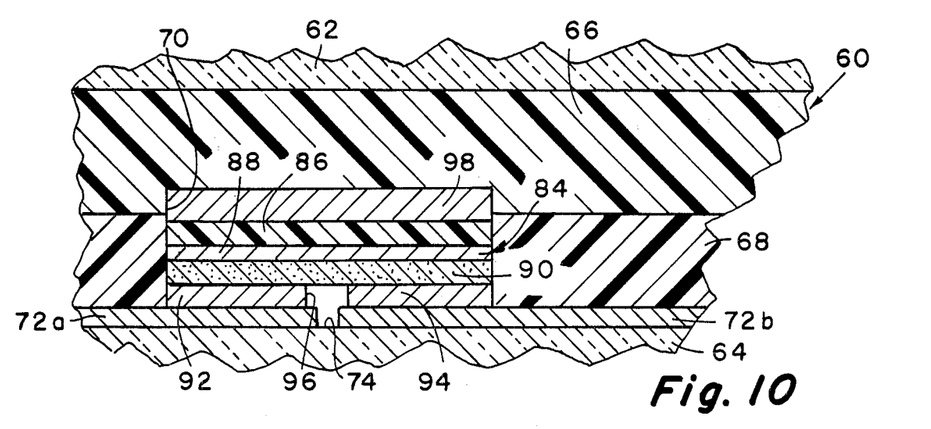
FIG. 10 is a fragmentary, enlarged, sectional view of the panel assembly of FIGS. 7-9 taken along plane X—X of FIG. 7.
Figures 11, 12, 13, 14, 15:
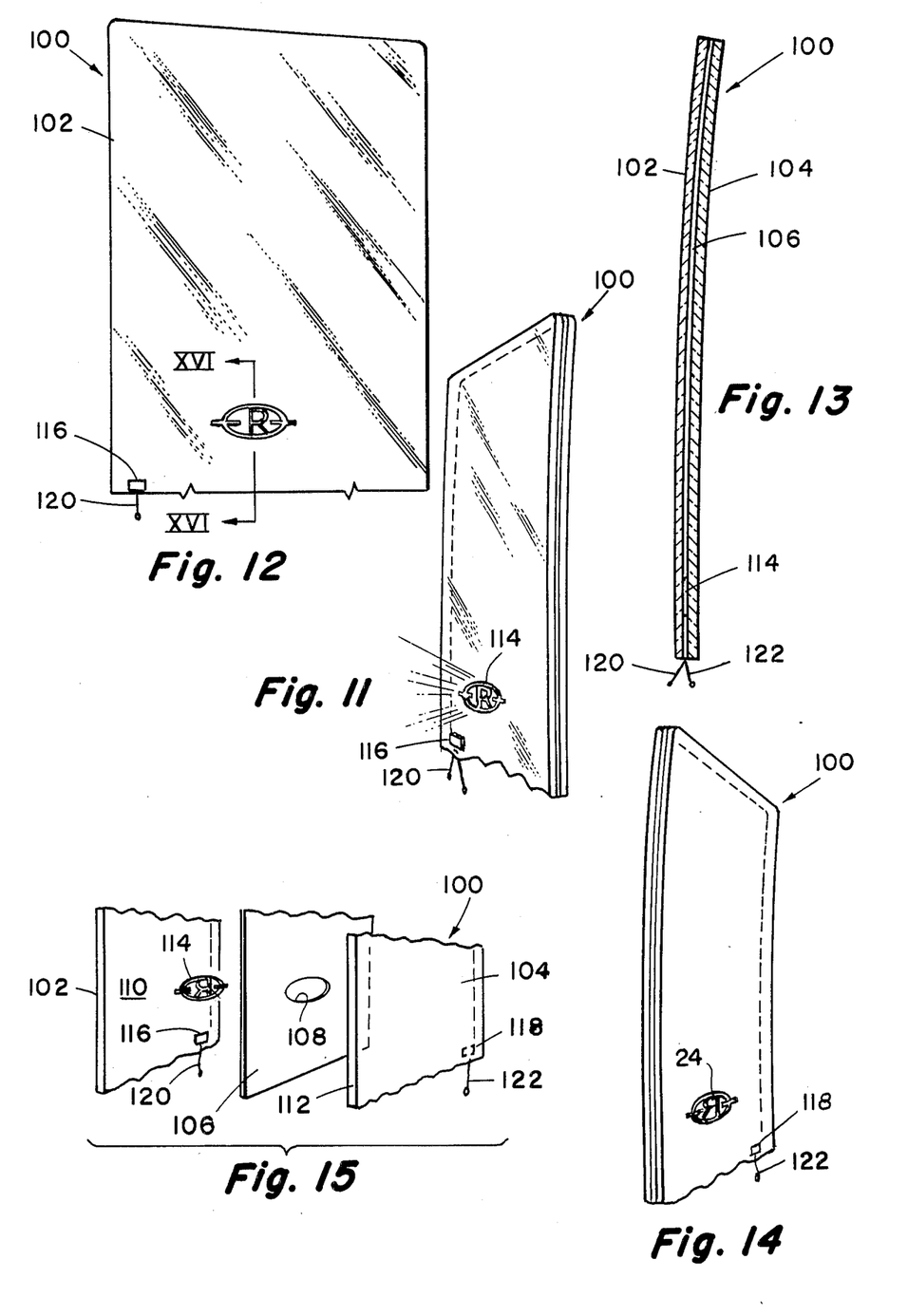
FIG. 11 is a front perspective view of a third embodiment of the panel assembly of the present invention.
FIG. 12 is a front perspective view of the panel assembly of FIG. 11 taken from a different angle.
FIG. 13 is a side elevation of the panel assembly of FIGS. 11 and 12.
FIG. 14 is a rear perspective view of the panel assembly of FIGS. 11-13.
FIG. 15 is a fragmentary, exploded, perspective view of a portion of the panel assembly of FIGS. 11-14.

Sandwiched intermediate panel 62, 64 are a pair of oval lamination layers 66, 68 cut from sheet polyvinyl butyral as in assembly 10. Front lamination layer 66 is continuous while rear lamination layer 68 includes a cutout 70 having the shape of the metal symbol or design 98 and electroluminescent lighting assembly 84 which will be received between panels 62, 64 in the final assembly.

As in panel 10, rear panel 64 of panel assembly 60 includes a pair of electrically separate transparent electrically conductive coatings 72a and 72b separated by a dielectric or deletion line 74. Electrical energy is supplied to coatings 72a, 72b by silver paint spot conductors 76, 78 (FIGS. 7 and 8) which, in turn, have electrical leads 80, 82 soldered thereto in the same manner as in panel assembly 10. Received within cutout 70 prior to assembly are electroluminescent lighting assembly or pad 84 and metal element 98. Lighting assembly 84 is cut in a designated outline or configuration to match element 98 which is positioned in front of assembly 84 between that assembly and lamination layer 66. When assembled, element 98 is at least partially embedded in lamination layer 66 for positioning and retention purposes. As in assembly 10, lighting assembly 84 includes four layers including a base or support layer 86 formed from thin polyester film which is relatively flexible, a thin transparent electrically conductive coating 88 on layer 86 and formed from a material such as indium tin oxide, a phosphor layer 90 and a pair of electrically separated, backing electrodes 92, 94 of substantially equivalent surface area and insulated from one another by deletion or dielectric strip or line 96. Preferably, backing electrodes 92, 94, as in panel assembly 10, are formed from a thin metallic layer of nickel or the like having excellent electrical conductivity.

When assembled, the symbol or design 98 if formed from metal will reflect light in sufficiently high ambient light conditions. Electroluminescent pad 84 is positioned with its deletion line 96 in registry with deletion line 74 on back panel 64 between conductive coatings 72a, 72b. When assembly 60 is laminated under heat and pressure as is assembly 10, metallic symbol 98 is thus permanently positioned through contact with the second lamination layer 66 while electroluminescent pad assembly is positioned within cutout 70 in layer 68. When electrical energy is applied through electrical leads 80, 82 and conductors 76, 78 to conductive coatings 72a, 72b, electric current and, thus, a potential is applied to backing electrodes 92, 94 across phosphor layer 90 to and from transparent electrically conductive coating 88 to cause lighting assembly 84 to emit light and backlight the opaque metal symbol or element 98 which is visible in the smaller oval area 67 of the front panel 62. Element 98 appears to "float" within transparent area 67 without any visible electrical connections thereto.

Alternately, object 98 may be formed from high temperature resistant plastic or resinous material or some other material and may be translucent, tinted or colored, or opaque. If translucent, at least a portion of the light from pad 84 will shine through element 98 as in embodiment 10. It is only necessary that element 98 be able to withstand the heat of lamination of assembly 60 such that it will not deform or lose its configuration during assembly.

A third embodiment 100 of the panel assembly is shown in FIGS. 11-16. While panel assembly 100 is similar in shape and appearance to panel assembly 10, the manner of supplying electrical energy across the composite electroluminescent light assembly 114 forming the symbol or design is different. Transparent electrically conductive coatings 110 and 112 are included, respectively, on the inside surfaces of front and rear glass panels 102, 104 of the assembly. The compositions and thicknesses of the various panels, layers coatings and films in assembly 100 are the same as in assemblies 10 and 60.

More specifically, as shown in FIGS. 12-15, panel assembly 100 includes front and rear, transparent, glass panels 102, 104 sandwiching a single lamination layer 106 of polyvinyl butyral as in panel 10. Lamination layer 106 includes contoured cutout 108 corresponding to and receive insignia, indicia or design 114 in the ultimate panel assembly. Each panel 102, 104 includes a continuous transparent electrically conductive coating 110, 112 respectively covering its entire inside surface. Fired on at an inconspicuous lower corner of each panel 102, 104 are silver spot conductors 116, 118, respectively, having soldered thereto wire or other conductors 120, 122, respectively, for connection of coatings 110, 112 to a power source.

Figure 16:
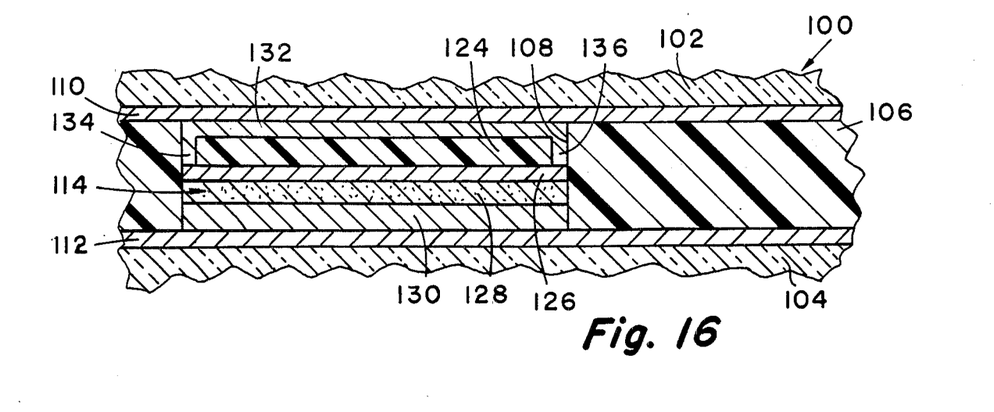
FIG. 16 is an enlarged, fragmentary, sectional view of the panel assembly of FIGS. 11-15 taken along plane XVI—XVI of FIG. 12.

Design 114 is formed from a composite electroluminescent lighting assembly or pad 114 as in panels 10 and 60 but having a somewhat different configuration internally. Like design 24 in panel 10, assembly 114 includes a base or support layer of thin polyester film 124 such as Mylar film, a transparent electrically conductive coating 126 applied thereover, followed by a phosphor layer 128 and a continuous backing electrode of nickel or other metallic film 130 which is in contact with rear transparent electrically conductive coating 112 on panel 104. On the opposite side of lighting assembly 114 from backing electrode 130, however, is applied a thin partially reflective, light transmitting metallic coating or film 132 of stainless steel or other material. Coating 132 has electrical connecting portions 134, 136 extending transversely of the lighting assembly or pad 114 across the backing layer 124 into contact with at least one, and preferably two portions of transparent electrically conductive coating 126. Electrical contact portions 134, 136 are at the extreme edges of the pad and are abutted by the lamination layer 106 and the sides of cutout 108 therein. Accordingly, when power is applied through leads 120, 122 and connectors 116, 118, an electrical potential is applied through metallic coating 132 and electrical connecting portions 134, 136 to conductive coating 126 and, thence, across phosphor layer 128 through backing electrode 130 to the conductive coating 112 on the back panel 104. This causes lighting assembly 114 to emit light which is visible through coating 126, film 124 and the thin metallic coating 132 as well as coating 110 and front glass panel 102. In embodiment 100 there is no deletion or dielectric line in the transparent electrically conductive coating layers 110, 112 which is visible even on close inspection. However, as in the other embodiments, indicia, insignia or design 114 appears to "float" within a transparent assembly without any visible electrical connections.

In each case, panel assemblies 10, 60 and 100 may be secured or attached in a vehicle, appliance, sign, store display or other application in any convenient manner, it being necessary only to include an appropriate cover or framing to hide electrical connectors 40, 42, 76, 78, or 116, 118 such that no electrical connections of any kind are visible when the design or insignia is viewed through the transparent area of the panel assembly. As with assembly 10, panel assemblies 60 and 100 can utilize individual transformers 52 adjacent the assemblies as powered from a single DC power source or battery such as battery 50. Appropriate methods for securing assemblies 10, 60 or 100 as window assemblies in vehicles are shown in U.S. Pat. Nos. 4,072,340, 4,139,234, 4,364,214 and 4,364,595 issued to the same assignee as the present application, the disclosures of which are hereby incorporated by reference herein.

As will also be apparent to those skilled in the art, appropriate variations in panel assemblies 10, 60 and 100 may be made within the scope of the invention. Thus, the front and rear panel members may be formed from materials other than glass such as high temperature resistant plastic or other materials. Moreover, such panels need not be totally transparent. In fact, the rear panel itself can be translucent or opaque or covered with a fired ceramic frit which prevents the passage of light through the rear panel. In addition, more than two laminations of substantially rigid panels can be used. For instance, if three or more panels were used, designs could be incorporated which would appear to be at different depths when viewed through the transparent area of the front panel. In addition, the backing electrodes could be replaced by reflective metallic thin film layers or coated over or atop reflective layers such that when both panels of the assemblies 10, 60 and 100 were transparent, and sufficiently high light levels were present, the design, insignia or symbol would reflect light from both sides and be visible from either side of the assembly. Also, use of the present invention is not limited only to vehicles and appliances such as oven doors or the like, but may be also incorporated in signs, store displays or the like where appropriate power can be supplied and where "floating" decorative symbols without any visible electrical connections are desired.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

I claim:

1. A panel assembly for displaying illuminated indicia, insignia or designs comprising:
    a pair of sheet-like panels, at least one of which includes a transparent area therein;
    lamination means intermediate said panels for bonding said panels together, said lamination means being transparent after lamination;
    a transparent electrically conductive coating on one surface of at least one of said panels, said one surface facing inwarding of said assembly;
    electroluminescent lighting means for illuminating an area of said assembly when an electrical voltage is applied thereto, said lighting means being formed in a desired configuration between said panels in registry with said transparent area of said one panel, and having a surface contacting said transparent electrically conductive coating;
    a metallic layer intermediate said lighting means and said one panel which includes said transparent area and covering at least a portion of said lighting means such that it is visible through said transparent area of said one panel, said metallic layer being at least partially reflective of light incident thereon;
    conducting means positioned away from said lighting means for conducting electricity to said electrically conductive coating whereby said panels and lamination means form a laminated assembly with said lighting means therein such that when said conducting means are connected to an electrical source, said lighting means are illuminated without any electrically conductive means being visible adjacent or around said lighting means.

2. A panel assembly for displaying illuminated indicia, insignia or designs comprising:
    a pair of sheet-like panels, at least one of which includes a transparent area therein;
    lamination means intermediate said panels for bonding said panels together, said lamination means being transparent after lamination;
    a transparent electrically conductive coating on one surface of at least one of said panels, said one surface facing inwardly of said assembly;
    electroluminescent lighting means for illuminating an area of said assembly when an electrical voltage is applied thereto, said lighting means being formed in a desired configuration between said panels in registry with said transparent area of said one panel, and having a surface contacting said transparent electrically conductive coating;

a metallic layer intermediate said lighting means and said one panel which includes said transparent area and covering at least a portion of said lighting means such that is visible through said transparent area of said one panel;

conducting means positioned away from said lighting means for conducting electricity to said electrically conductive coating whereby said panels and lamination means form a laminated assembly with said lighting means therein such that when said conducting means are connected to an electrical source, said lighting means are illuminated without any electrically conductive means being visible adjacent or around said lighting means;

said transparent, electrically conductive coating being on the second of said panels and including a pair of mutually insulated coating areas; said one surface of said lighting means including a pair of mutually insulated backing electrodes; each backing electrode contacting a different one of said coating areas.

3. The panel assembly of claim 2 wherein said metallic layer is an opaque metal element which is back-lit by said lighting means when said lighting means are illuminated.

4. The panel assembly of claim 2 wherein said metallic layer is a thin, partially reflective, light transmitting metallic film on a second surface of said lighting means which is opposite said one surface of said lighting means, said thin metallic film contacting said one panel member whereby said metallic film reflects ambient light passing through said transparent area of said one panel but transmits light from said lighting means therethrough and is visible through said transparent area when said lighting means are illuminated.

5. The panel member of claim 4 wherein said thin metallic film is continuous over said entire second surface of said lighting means.

6. The panel assembly of claim 2 wherein said lighting means is a separate laminated assembly positioned between said panel members prior to assembly of the entire panel assembly and having a light transmitting, flexible, resinous plastic film coated with a thin transparent electrically conductive coating, said thin conductive coating in turn covered with a layer of electroluminescent material; said backing electrodes including thin metallic layers applied over said electroluminescent material with a dielectric area separating said backing electrodes.

7. The panel assembly of claim 1 wherein said lighting means is deposited directly on one of said panel members prior to lamination of said panel assembly.

8. The panel assembly of claim 7 wherein said lighting means includes a layer of electroluminescent material over said metallic layer and at least one backing electrode over said electroluminescent material.

9. The panel assembly of claim 1 including a second transparent, electrically conductive coating on the inwardly facing surface of the other of said panels; said conducting means including means for conducting electricity to both of said transparent electrically conductive coatings.

10. A panel assembly for displaying illuminated indicia, insignia or designs comprising:

a pair of sheet-like panels, at least one of which includes a transparent area therein;

lamination means intermediate said panels for bonding said panels together, said lamination means being transparent after lamination;

a transparent electrically conductive coating on one surface of at least one of said panels, said one surface facing inwardly of said assembly;

electroluminescent lighting means for illuminating an area of said assembly when an electrical voltage is applied thereto, said lighting means being formed in a desired configuration between said panels in registry with said transparent area of said one panel, and having a surface contacting said transparent electrically conductive coating;

a metallic layer intermediate said lighting means and said one panel which includes said transparent area and covering at least a portion of said lighting means such that it is visible through said transparent area of said one panel;

conducting means positioned away from said lighting means for conducting electricity to said electrically conductive coating whereby said panels and lamination means form a laminated assembly with said lighting means therein such that when said conducting means are connected to an electrical source, said lighting means are illuminated without any electrically conductive means being visible adjacent or around said lighting means;

a second transparent, electrically conductive coating on the inwardly facing surface of the other of said panels; said conducting means including means for conducting electricity to both of said transparent electrically conductive coatings;

said lighting means being a laminated assembly having a light transmitting, flexible, resinous plastic film coated with a third thin transparent electrically conductive coating; said third thin conductive coating in turn covered with a layer of electroluminescent material; said metallic layer positioned intermediate said lighting means and said one panel having at least one portion extending into engagement with said third transparent, electrically conductive coating on said light transmitting, flexible resinous plastic film.

11. The panel assembly of claim 1 wherein said one of said panels is a sheet of transparent glass; the other of said panels also being a sheet of glass; said lamination means including a thin sheet of polyvinyl butyrate.

12. A panel assembly for displaying illuminated indicia, insignia or designs comprising:

a pair of sheet-like panel members, at least one of which includes a transparent area therein;

lamination means for adhering said panel members to one another, said lamination means being substantially transparent at least in an area corresponding to said transparent area of said one panel member;

a pair of mutually insulated, transparent electrically conductive coating areas on one surface of at least one of said panel members, said one surface facing inwardly of said assembly;

electroluminescent lighting means for illuminating an area of said assembly when electrical voltage is applied thereto, said lighting means being formed in a desired configuration between said panel members in registry with said transparent area of said one panel member, and including a pair of mutually insulated backing electrodes on one surface of said lighting means;

said lighting means engaging said coating areas such that each backing electrode contacts a different one of said coating areas;

conducting means positioned away from said lighting means for conducting electricity to said electrically conductive coating areas whereby when said conducting means are connected to an electrical source, said lighting means are illuminated without any electrically conductive means being visible adjacent or around said lighting means.

13. The panel assembly of claim 12 including a partially reflective, light transmitting metallic coating on another surface of said lighting means and adapted to reflect light through said transparent area of said one panel member.

14. The panel assembly of claim 13 wherein said partially reflective metallic coating has a light transmission of about 8 percent and a reflectivity of about 92 percent.

15. The panel assembly of claim 12 including a separate element formed in a desired configuration and positioned between said lighting means and said one panel member, said element being visible within said transparent area.

16. The panel assembly of claim 15 wherein said separate element is opaque and only partially covers said lighting means, said opaque element being back-lit by said lighting means.

17. The panel assembly of claim 16 wherein said lamination means include a pair of resinous, polymeric layers applied one over the other; at least one of said layers being transparent after lamination to said panel members and being intermediate said opaque element and said one panel member; the other of said layers having a cutout area corresponding in shape to said lighting means with said lighting means received in said cutout area.

18. The panel assembly of claim 12 wherein said lamination means include a layer of resinous material bonding said panel members together.

19. The panel assembly of claim 18 wherein said panel members are transparent sheets of glass.

20. The panel assembly of claim 18 wherein said one panel member is a transparent sheet of glass.

21. The panel assembly of claim 12 wherein said lighting means is a separate laminated assembly positioned between said panel members prior to assembly of the entire panel asssembly and having a light transmitting, flexible, resinous plastic film coated with a thin transparent electrically conductive coating; said thin conductive coating in turn covered with a layer of electroluminescent material; said backing electrodes including thin metallic layers applied over said electroluminescent material with a dielectric area separating said backing electrodes.

22. The panel assembly of claim 21 wherein said backing electrodes are partially reflective, light transmitting metallic coatings.

23. The panel assembly of claim 21 wherein said lighting means is a thin, translucent, polyester film having a coating of indium tin oxide thereon covered with a phosphor material; said backing electrodes being thin layers of nickel.

24. The panel assembly of claim 12 wherein said backing electrodes are separated by a dielectric strip; said transparent electrically conductive coating areas being separated by an uncoated strip on one of said panel members; said dielectric strip being aligned with said uncoated strip.

25. The panel assembly of claim 12 wherein surface areas of said two backing electrodes are substantially equivalent.

26. The panel assembly of claim 12 wherein the surface areas of said backing electrodes are unequal such that the electrode with the greater surface area produces a brighter illumination when connected to an electrical source.

27. The panel assembly of claim 12 wherein said transparent, electrically conductive coating areas are on the second of said panel members.

28. A panel assembly for displaying illuminated indicia, insignia or designs comprising:

a pair of sheet-like panel members, at least one of which includes a transparent area therein;

lamination means for adhering said panel members to one another, said lamination means being substantially transparent at least in an area corresponding to said transparent area of said one panel member;

each panel member including a transparent, electrically conductive coating on its surface, said surfaces facing inwardly of said assembly;

electroluminescent lighting means for illuminating an area of said assembly when electrical voltage is applied thereto, said lighting means being formed in a desired configuration, located between said panel members in registry with said transparent area of said panel member and including a light transmitting, flexible, resinous plastic film coated with a third thin transparent electrically conductive coating; said third thin conductive coating in turn covered with a layer of electroluminescent material and a thin metallic backing electrode applied over said electroluminescent material and contacting at least one of said transparent electrically conductive coatings; a thin, partially reflective, light transmitting metallic film on a surface of said resinous plastic film opposite said third transparent electrically conductive coating, said thin metallic film having at least one portion engaging said third transparent electrically conductive coating;

conducting means positioned away from said lighting means for conducting electricity to said electrically conductive coating areas on said panel members whereby when said conducting means are connected to an electrical source, said lighting means are illuminated without any electrically conductive means being visible adjacent or around said lighting means and said panel members and lamination means form a laminated assembly with said lighting means therein.

29. The panel assembly of claim 28 wherein said backing electrodes is a partially reflective, light transmitting metallic coating, said partially reflective, light transmitting metallic film being a thin layer of a stainless steel.

30. The panel assembly of claim 28 wherein said thin metallic film includes at least two portions extending along two edges of said flexible, resinous plastic film into contact with said third transparent, electrically conductive film.

31. The panel assembly of claim 28 wherein said backing electrode is a partially reflective, light transmitting, thin metallic layer.

32. The panel assembly of claim 28 wherein each of said panel members is a sheet of glass; at least one of said glass sheets being transparent.

33. A panel assembly for displaying illuminated indicia, insignia or designs comprising:
- a pair of sheet-like panels, at least one of which includes a transparent area therein;
- lamination means intermediate said panels for bonding said panels together, said lamination means being transparent after lamination;
- a pair of mutually insulated, transparent, electrically conductive coating areas on one surface of at least one of said panels, said one surface facing inwardly of said assembly;
- electroluminescent lighting means for illuminating an area of said assembly when an electrical voltage is applied thereto, said lighting means being formed in a desired configuration between said panels in registry with said transparent area of said one panel, and having a surface including a pair of mutually insulated backing electrodes, each of said backing electrodes contacting a different one of said transparent electrically conductive coating areas;
- a thin object formed in a desired configuration and positioned intermediate said lighting means and said one panel which includes said transparent area and covering at least a portion of said lighting means such that said object is visible through said transparent area of said one panel;
- conducting means positioned away from said lighting means for conducting electricity to said electrically conductive coating areas whereby said panels and lamination means form a laminated assembly which supports and positions said lighting means and said thin object such that when said conducting means are connected to an electrical source, said lighting means are illuminated without any electrical conductors being visible adjacent or around said lighting means.

34. The panel assembly of claim 33 wherein said thin object is an opaque element which is back-lit by said lighting means when said lighting means are illuminated.

35. The panel assembly of claim 33 wherein said lamination means include a pair of resinous, polymeric layers applied one over the other; at least one of said layers being transparent after lamination to said panel members and being intermediate said thin object and said one panel member; the other of said layers having a cutout area corresponding in shape to said lighting means with said lighting means received in said cutout area.

36. The panel assembly of claim 12 whereing said lighting means is deposited directly on one of said panel members prior to lamination of said panel assembly.

37. A panel assembly for displaying illuminated indicia, insignia or designs comprising:
- a pair of sheet-like panel members, at least one of which includes a transparent area therein;
- lamination means for adhering said panel members to one another, said lamination means being substantially transparent at least in an area corresponding to said transparent area of said one panel member and including an opening therein in registry with said transparent area of said one panel member;
- each panel member including a transparent, electrically conductive coating on its surface, said surfaces facing inwarding of said assembly;
- electroluminescent lighting means for illuminating an area of said assembly when electrical voltage is applied thereto, said lighting means being formed in a desired configuration, located between said panel members in registry with said transparent area of said panel member and within said opening in said lamination means, being in contact with said conductive coatings on said surfaces of said panel members, and including a layer of electroluminescent material; and
- conducting means positioned away from said lighting means for conducting electricity to said electrically conductive coating areas on said panel members whereby when said conducting means are connected to an electrical source, said lighting means are illuminated without any electrically conductive means being visible adjacent or around said lighting means and said panel members and lamination means form a laminated assembly with said lighting means therein.

* * * * *